United States Patent [19]
Colbert

[11] Patent Number: 5,415,435
[45] Date of Patent: May 16, 1995

[54] PIPE COUPLING SUPPORT CLAMP

[76] Inventor: Patrick F. Colbert, 29 Sicomac Rd., Hawthorne, N.J. 07506

[21] Appl. No.: 203,333

[22] Filed: Feb. 28, 1994

[51] Int. Cl.⁶ ............................................. F16L 55/00
[52] U.S. Cl. ...................................... 285/23; 285/24; 285/61; 285/112; 285/419
[58] Field of Search ........................ 285/61, 62, 63, 64, 285/177, 112, 15, 23, 24, 419; 248/58, 62, 74.1

[56] References Cited

U.S. PATENT DOCUMENTS

| | | | |
|---|---|---|---|
| 1,813,528 | 7/1931 | Clark | 285/61 |
| 2,469,538 | 5/1949 | Young | 285/61 X |
| 2,766,966 | 10/1956 | Jacoby | 285/61 X |
| 2,963,305 | 12/1960 | Miller | 285/114 |
| 3,586,354 | 6/1971 | Boscacci | 285/369 |
| 3,937,499 | 2/1976 | Courtot | 285/61 X |
| 4,012,470 | 3/1977 | Thayer | 248/74.1 |
| 4,343,497 | 8/1982 | Bot | 285/61 |
| 4,518,177 | 5/1985 | Deakins | 285/64 |
| 4,549,751 | 10/1985 | Grove | 285/61 |

Primary Examiner—Dave W. Arola
Attorney, Agent, or Firm—Weingram & Zall

[57] ABSTRACT

A pipe support clamp includes a pair of like outer hinged rigid metal wire rings spaced apart for mounting about the ends of two pipe sections to be joined together. The rings include two pivotable semicircular sections joined at the lower ends by a hinge. Inner semicircular rings are secured to the outer rings by radial spacers. The inner rings are adapted to fit closely about and hold the ends of the two pipe sections. A pair of turnbuckles at the other ends of the outer rings secure the pivotable semicircular sections together when the clamp is moved from an open to a closed position. A coupling device for permanently securing and sealing the pipe ends can then be mounted around the ends within the spaced apart rings. The support clamp is then removed.

8 Claims, 2 Drawing Sheets

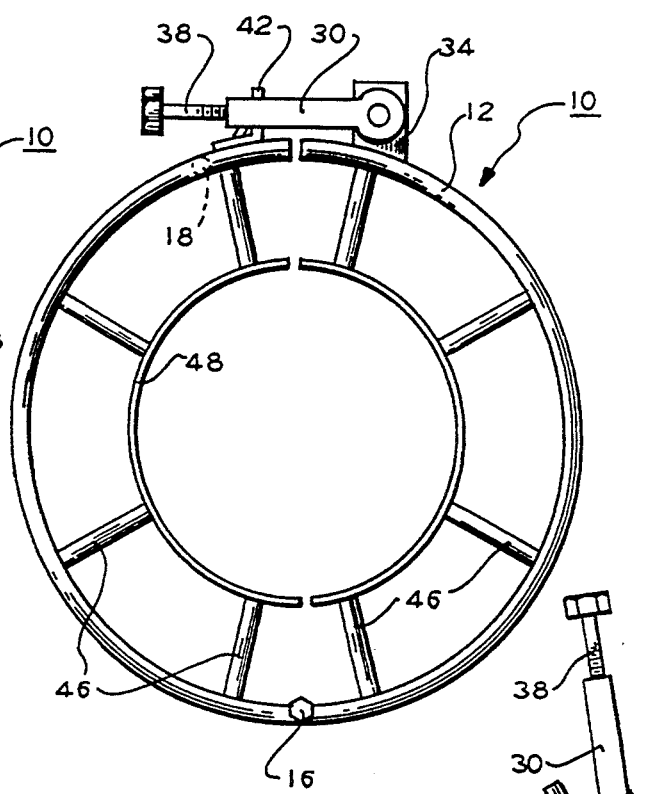
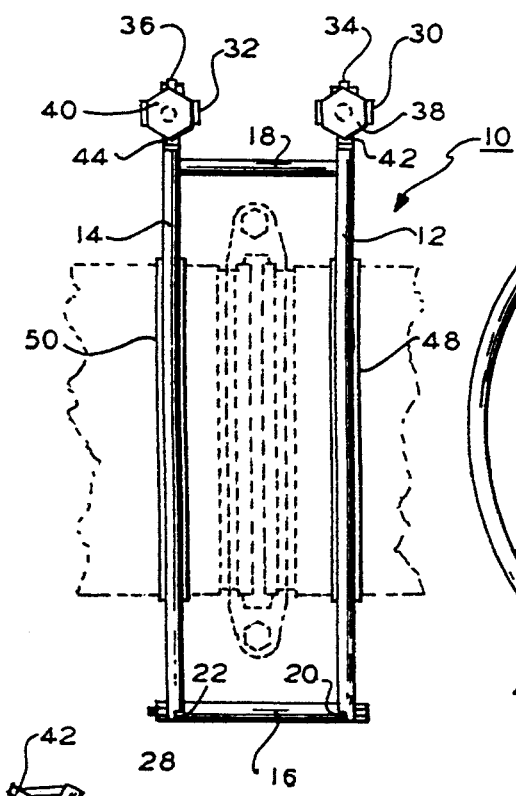
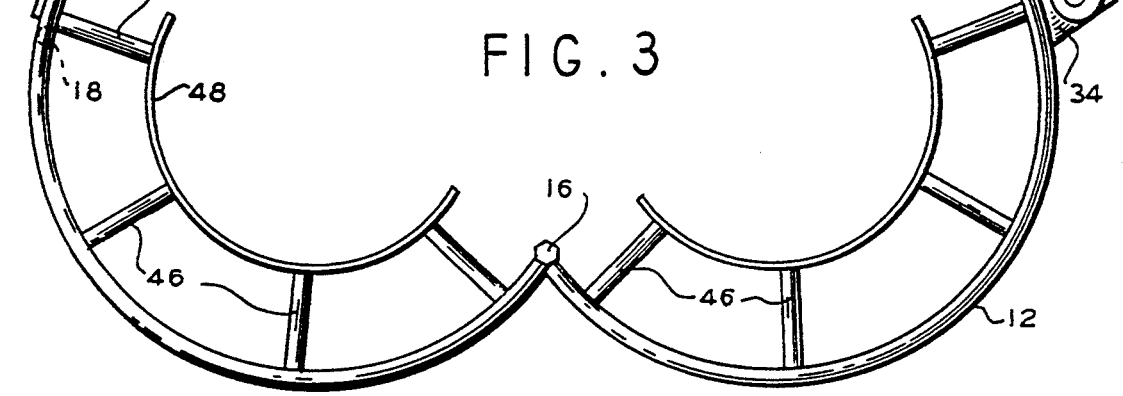
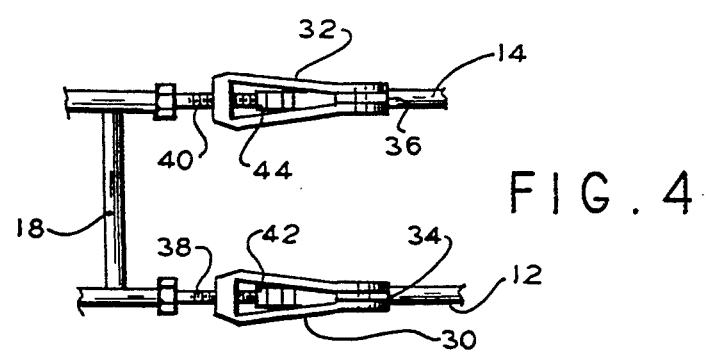

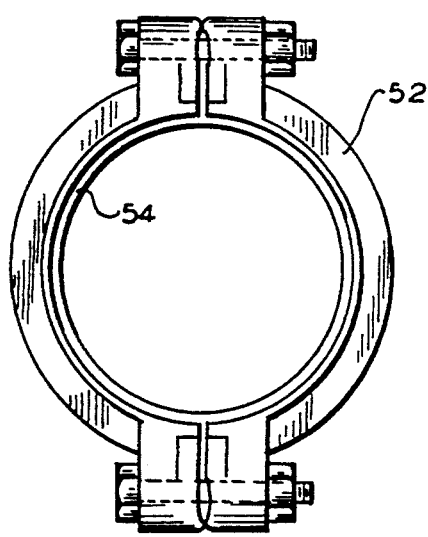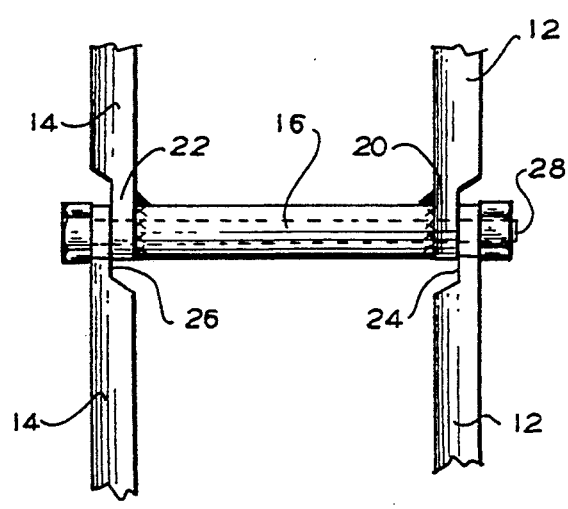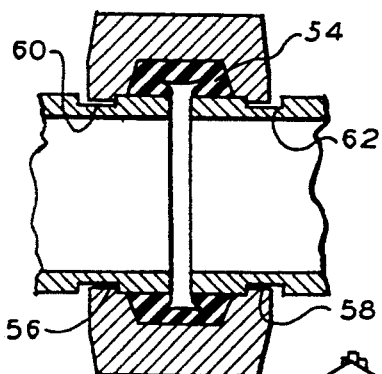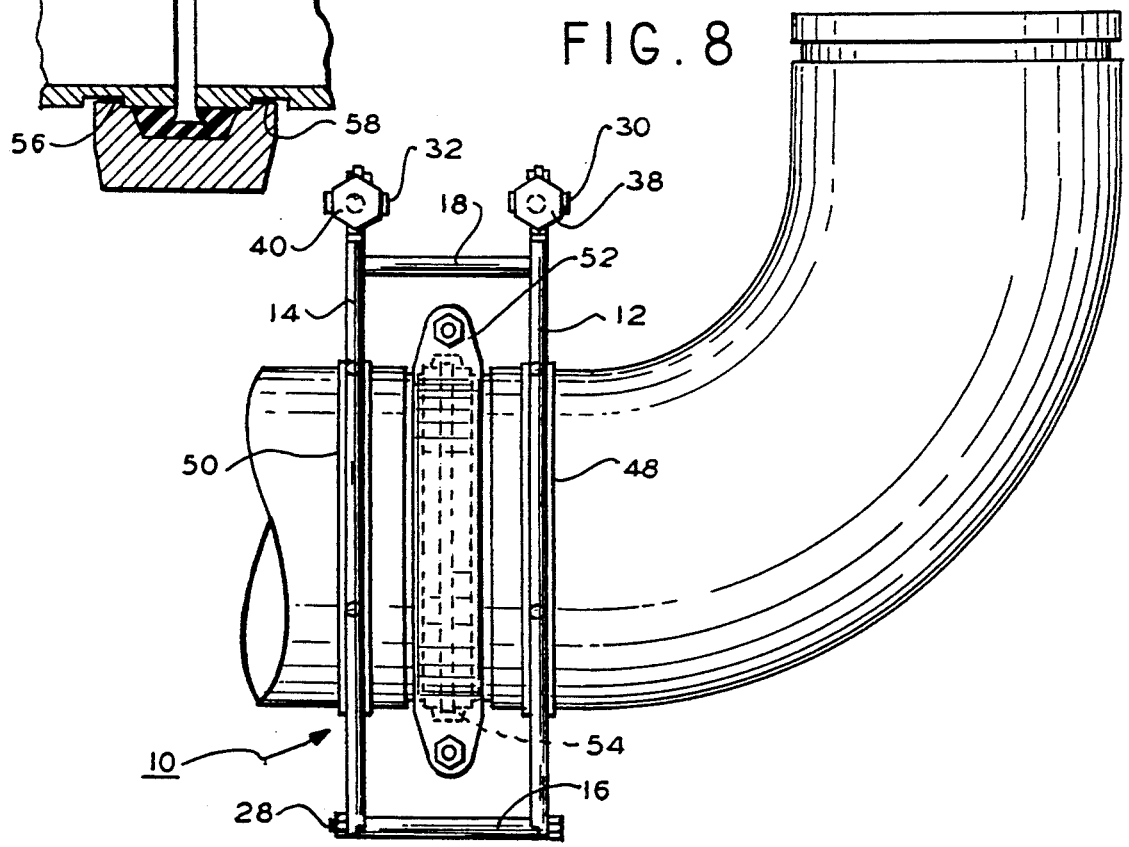

PIPE COUPLING SUPPORT CLAMP

BACKGROUND OF THE INVENTION

1. Field of the Invention

The present invention relates to devices for supporting and securing pipe joints and particularly to a removable clamp support structure which facilitates the alignment, coupling and sealing of heavy duty pipe ends.

2. Description of the Prior Art

Presently known devices for coupling adjacent pipe ends incorporate structures which fit directly over and cover the area of the joint so that the joined ends are not visible and are not accessible for further aligning, sealing or welding operations. An example of a known coupling incorporates a resilient cylindrical gasket and band clamps for sealing the ends, as shown in U.S. Pat. No. 3,586,354 to Boscacci. The assembled coupling remains with and surrounds the joint so that it is inaccessible. Another type of clamp used for connecting a hose to a filling pipe of a tank is shown in U.S. Pat. No. 2,963,305 to Miller. This clamp has an open area and a connecting rod between a pair of split clamping rings one of which includes semicircular sections connected by a pivot pin. This structure however is not useful for sealing abutting ends and cannot handle heavy duty applications such as larger diameter pipes required for water and steam lines.

A particular pipe coupling used for joining heavy duty pipe ends is known as the Gruvlok coupling, manufactured by the Grinnel Corporation. The pipe ends have circumferential grooves formed adjacent to the ends. A split cast steel housing encircling the two ends includes coupling keys which engage the grooves of the adjacent pipe ends. A resilient neoprene gasket within the housing provides a leak-tight seal around the joint between the pipe ends. The housing is bolted around the ends to secure the coupling, with the gasket having a cavity that is pressurized. However, it is difficult to manually align the pipe ends and mount the coupling when employing large heavy duty pipes in construction projects. Similar problems exist with pipe joints to be welded.

OBJECTS AND SUMMARY OF THE INVENTION

A primary object of the present invention is to provide a unique device for supporting and aligning pipe ends to simplify the coupling of the two ends.

It is another object of the invention to provide a removable clamp support to hold and align the adjacent pipe ends to be joined together by a mechanical coupling or by welding.

A further object of the invention is to support heavy duty pipe ends in a position to facilitate manual alignment and coupling of the ends.

An additional object of the invention is to provide a supporting clamp for pipe ends to be joined which permits access to the ends for the mechanical fitting and sealing of the ends.

It is also an object of the invention to provide a unique removable clamp configuration which readily fits over and holds the adjacent pipe ends to facilitate mounting and securing a coupling around the two ends.

A still further object of the invention is to provide a pipe clamp configuration which is readily adaptable for joining pipe ends of various sizes and types of connections.

These objects are achieved with a unique pipe support clamp including a pair of like outer hinged rings which are spaced apart for mounting about the adjacent ends of the two pipe sections to be joined. The rings are formed of rigid solid metal wire rods that have pivotable semicircular sections joined at the lower ends by a hinge. Inner semicircular rings secured to and spaced from the outer rings are adapted to fit closely about the adjacent pipe ends. Turnbuckles at the opposite ends of the outer rings are tightened to secure the pivotable semicircular sections together when the clamp structure is moved from an open to a closed position about the pipe ends to align and hold the ends together. The coupling structure for permanently securing and sealing the ends can then be mounted around the ends within the spaced apart rings. The support clamp structure is then removed for future use. Different sized support clamp rings may be used to accommodate various sized pipes. Other objects and advantages will become apparent from the following description in conjunction with the accompanying drawings.

BRIEF DESCRIPTION OF THE DRAWINGS

The invention will be described with reference to the accompanying drawings in which:

FIG. 1 is an end view of the pipe support clamp structure of the present invention;

FIG. 2 is a front view of the pipe support clamp;

FIG. 3 is an end view showing the pipe support clamp in an open position;

FIG. 4 is a top view of a portion of a clamp showing the turnbuckles which secure the pipe support clamp around the adjacent pipe ends to be coupled;

FIG. 5 is a bottom view showing the hinge portion of the pipe support clamp;

FIG. 6 is an end view of the Gruvlok coupling which couples and seals the adjoining pipe ends;

FIG. 7 is a partial cross sectional view of the Gruvlok coupling which engages the grooved pipe ends and encloses the sealing gasket; and FIG. 8 is a front view of the assembled clamp support about two pipe ends secured by a coupling structure.

DETAILED DESCRIPTION

As shown in FIGS. 1 and 2, the pipe support clamp 10 includes a pair of like split outer hinged rings 12, 14, formed of rigid heavy metal cast iron wire, spaced apart and secured at a lower end by a common tubular hinge structure 16 and at one section of the upper open end by a solid bar 18. The front lower ends 20, 22 of rings 12, 14, as shown in FIG. 5, are secured to the tubular end portions of the hinge 16 while the back lower ends 24, 26, are secured to the pivotable outer portions of the hinge. A central pivot pin 28 extends through the hinge and is secured at each end.

As shown in FIGS. 2, 3 and 4, rings 12, 14 each include two pivotable semicircular sections joined at the lower ends by hinge 16. The open upper ends include a pair of turnbuckles 30, 32 which permit the semicircular sections of the rings to be brought together and secured about the ends of two pipes which are to be joined. Each of the turnbuckles is pivotally secured to one end of each ring section 34, 36 and includes threaded loop portions with bolts 38, 40 which are adapted to be positioned over and engage posts 42, 44 at the opposing ends. When the bolts are tightened, the open ends of the ring sections are brought together to enclose the pipe ends.

Each of the outer rings 12, 14 include a plurality of radial spacer rods 46 which join pairs of semicircular inner rings 48, 50 to the respective outer rings. It is the inner rings that engage the enclosed ends of the pipes to be held in place while applying the coupling device to join and seal the pipe ends. The dimensions of the various components including outer and inner rings and spacers may be adjusted to accommodate different sized pipes. A typical example of the size of the pipe support structure may be about an 8 to 12 inch diameter for the inner rings and a 16 to 20 inch diameter for the outer rings. The rigid wire rings may be of a ⅜ inch thick cast iron.

FIGS. 6, 7, and 8 show the coupling structure 52 which couples and seals the ends together. This includes a unitary resilient ring gasket 54 having a cross sectional C-shape which is fitted over the adjacent pipe ends held in place by the pipe support clamp 10. The coupling 52 includes two halves which fit around the gasket. The metal coupling includes coupling keys 56, 58 which engage circumferential grooves 60, 62 in the pipe ends. When the two halves of the coupling are bolted together, a secure pressure tight seal is formed about the pipe ends to provide a final coupling which remains in place. The pipe support clamp is then removed for use in another pipe fitting operation.

The same support clamp may similarly be used for other pipe connections such as angles and elbows and other joining operations such as welding, since the pipe ends remain accessible while being supported in a desired position. The device may also be used with various liquids and fluids requiring heavy duty pipes such as hot and cold water systems, steam pipes and oil pipes. While only a single embodiment has been illustrated and described, other variations may be made in the particular design and configuration without departing from the scope of the invention as set forth in the appended claims.

What is claimed is:

1. A pipe coupling support clamp comprising:
   a pair of like outer rings secured together and spaced apart for positioning about the adjacent opposing ends of two pipes which are to be coupled together, each of said rings including a pair of semicircular sections;
   hinge means at one end of each pair of said semicircular ring sections, said hinge means pivotally securing respective ends of each of said ring sections and pair of rings together and spacing said rings apart over said opposing pipe ends;
   adjustable securing means at the other ends of each pair of said ring sections for securing respective said other ends together;
   a pair of like inner rings each including two semicircular sections; and
   a plurality of spacers joining said inner rings to said outer rings, said inner rings being engageable with and holding said pipe ends when said securing means secures said other ends together.

2. The device of claim 1 wherein said adjustable securing means includes a pair of turnbuckles positioned at said other ends, each said turnbuckle including a pivotable threaded member and bolt mounted on one portion of said other ends and a post mounted on an opposing portion, said pivotable member being engageable with said post when said other ends are brought together.

3. The device of claim 2 wherein said plurality of spacers are disposed radially between said inner and outer rings.

4. The device of claim 3 wherein said outer rings are of rigid metal wire.

5. The device of claim 4 including a fixed spacer connected between said outer rings adjacent to said other ends for further securing and spacing said rings.

6. The device of claim 5 wherein said hinge means permits said semicircular ring sections to pivot from an open position to a closed position about the adjacent opposing ends of two pipes to be coupled together and back to said open position for removal of said pipe coupling support.

7. The device of claim 6 wherein each of said pairs of inner and outer rings are spaced apart over said pipe ends providing an accessible open area for coupling of said pipe ends.

8. The device of claim 7 wherein the radial dimensions of said inner and outer rings and plurality of spacers may be changed to receive pipes of different sizes.

* * * * *